US011975492B2

(12) United States Patent
Rice

(10) Patent No.: US 11,975,492 B2
(45) Date of Patent: May 7, 2024

(54) TRANSFUSE ROLLER TRACKING IN SELECTIVE LAYER DEPOSITION BASED ADDITIVE MANUFACTURING

(71) Applicant: Evolve Additive Solutions, Inc., Minnetonka, MN (US)

(72) Inventor: Andrew Rice, Chaska, MN (US)

(73) Assignee: Evolve Additive Solutions, Inc., Minnetonka, MN (US)

( * ) Notice: Subject to any disclaimer, the term of this patent is extended or adjusted under 35 U.S.C. 154(b) by 671 days.

(21) Appl. No.: 16/562,624

(22) Filed: Sep. 6, 2019

(65) Prior Publication Data
US 2020/0079025 A1    Mar. 12, 2020

Related U.S. Application Data

(60) Provisional application No. 62/727,777, filed on Sep. 6, 2018.

(51) Int. Cl.
*B29C 64/218*      (2017.01)
*B29C 64/393*      (2017.01)
*B33Y 10/00*       (2015.01)
*B33Y 30/00*       (2015.01)
(Continued)

(52) U.S. Cl.
CPC .......... *B29C 64/393* (2017.08); *B29C 64/218* (2017.08); *B33Y 10/00* (2014.12); *B33Y 30/00* (2014.12); *B33Y 50/02* (2014.12); *B29C 64/147* (2017.08)

(58) Field of Classification Search
CPC ... B29C 64/218; B29C 64/393; B29C 64/147; B33Y 10/00; B33Y 30/00; B33Y 50/02; B32B 37/04; B32B 37/0053
See application file for complete search history.

(56) References Cited

U.S. PATENT DOCUMENTS 8,119,053 B1 * 2/2012 Bedal ..................... B33Y 70/00
                                                    264/308
8,488,994 B2   7/2013 Hanson et al.
8,879,957 B2  11/2014 Hanson et al.
(Continued)

FOREIGN PATENT DOCUMENTS

KR    101848490 B1 *  5/2018   ......... B32B 37/0053
WO    2020051414      3/2020

OTHER PUBLICATIONS

"International Preliminary Report on Patentability," for PCT Application No. PCT/US2019/049885 dated Mar. 18, 2021 (10 pages).
(Continued)

*Primary Examiner* — Philip C Tucker
*Assistant Examiner* — Andrew L Swanson
(74) *Attorney, Agent, or Firm* — Pauly, DeVries Smith & Deffner LLC

(57) ABSTRACT

A method of additive manufacturing utilizing selective layer deposition includes measuring a transfuse force between a transfuse roller and a part build surface. An angular position of the transfuse roller is measured over time. A component of a transfuse force variation that is periodic in a rotational period of the transfuse roller is estimated, and a vertical position between the transfuse roller and the part build surface is adjusted to reduce pressure variations in transfuse roller force on the build part surface.

12 Claims, 6 Drawing Sheets

(51) Int. Cl.
    *B33Y 50/02*     (2015.01)
    *B29C 64/147*     (2017.01)

(56) References Cited

U.S. PATENT DOCUMENTS

| | | | | |
|---|---|---|---|---|
| 2015/0266236 A1* | 9/2015 | Farah | ............ | G01N 27/22 264/406 |
| 2015/0266242 A1* | 9/2015 | Comb | ............ | B29C 64/393 264/40.1 |

OTHER PUBLICATIONS

"International Search Report and Written Opinion," for PCT Application No. PCT/US2019/049885 dated Nov. 25, 2019 (14 pages).

\* cited by examiner

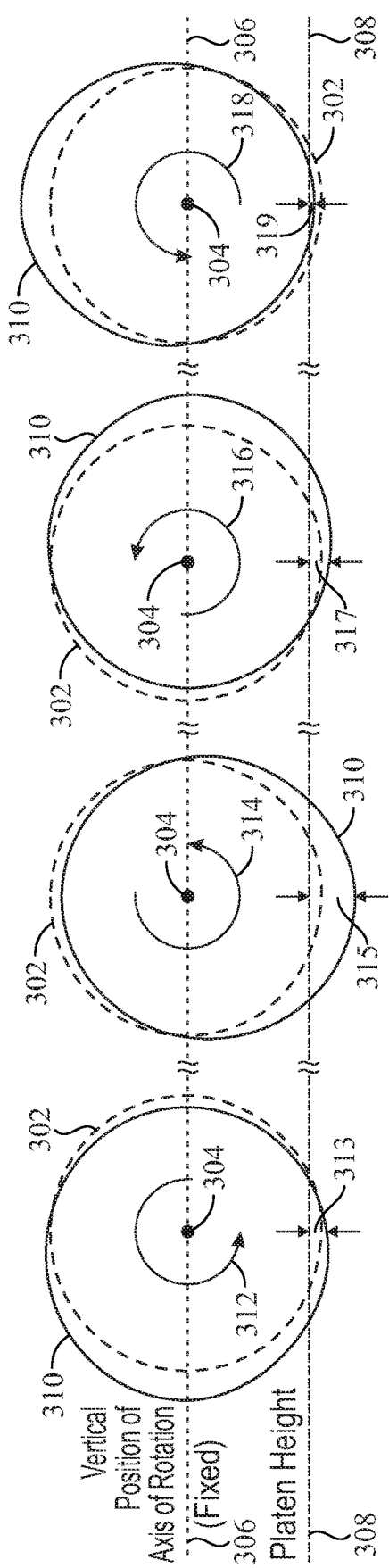
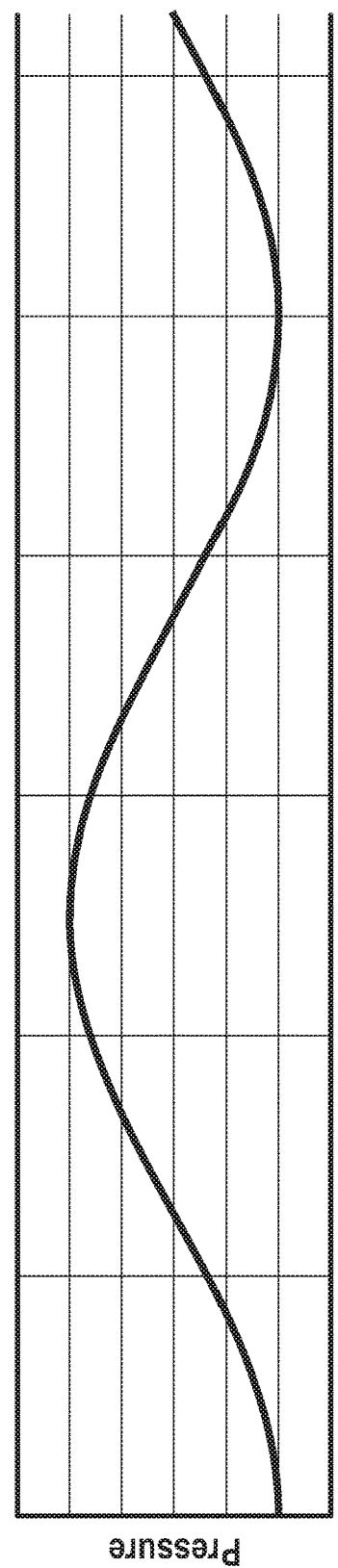

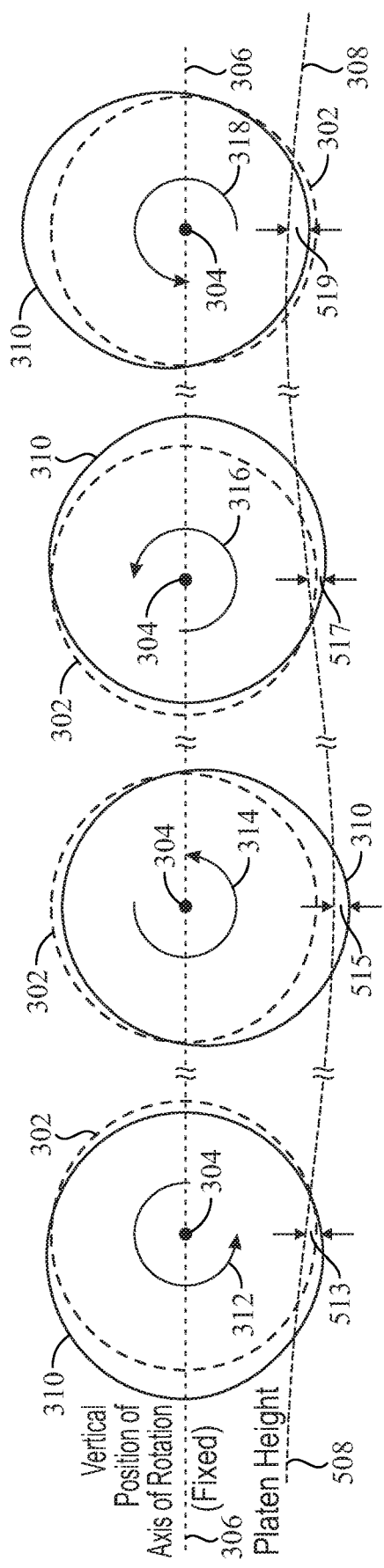
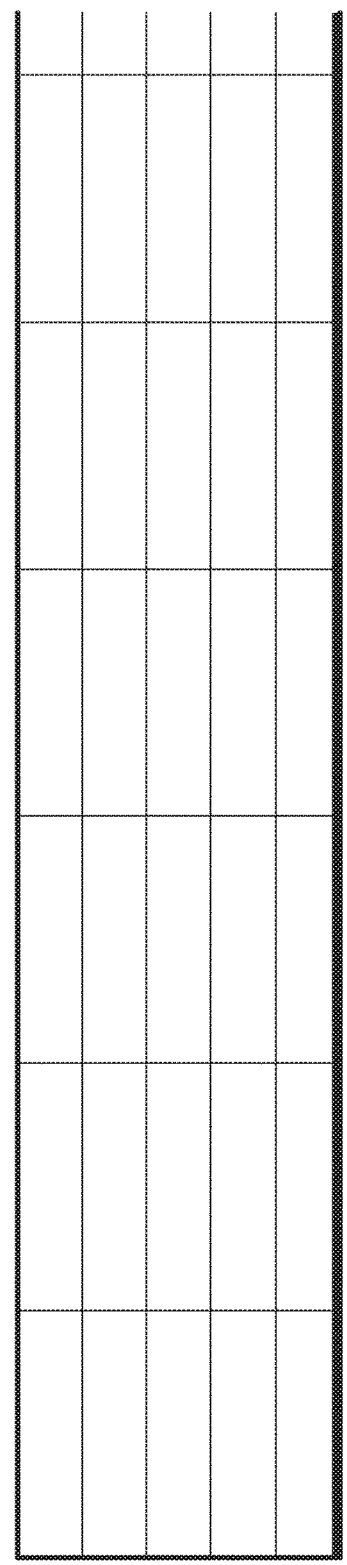

TRANSFUSE ROLLER TRACKING IN SELECTIVE LAYER DEPOSITION BASED ADDITIVE MANUFACTURING

This application claims the benefit of U.S. Provisional Application No. 62/727,777 filed Sep. 6, 2018, the content of which is herein incorporated by reference in its entirety.

BACKGROUND

The present disclosure relates to additive manufacturing systems for building three-dimensional (3D) parts and support structures. In particular, the present disclosure relates to additive manufacturing systems and processes for building 3D parts and support structures using an imaging process, such as electrostatography.

Additive manufacturing systems are used to build 3D parts from digital representations of the 3D parts (e.g., STL format files) using one or more additive manufacturing techniques. Examples of commercially available additive manufacturing techniques include extrusion-based techniques, ink jetting, selective laser sintering, powder/binder jetting, electron-beam melting, and stereolithographic processes. For each of these techniques, the digital representation of the 3D part is initially sliced into multiple horizontal layers. For each sliced layer, a tool path is then generated, which provides instructions for the particular additive manufacturing system to form the given layer.

For example, in an extrusion-based additive manufacturing system, a 3D part or model may be printed from a digital representation of the 3D part in a layer-by-layer manner by extruding a flowable part material. The part material is extruded through an extrusion tip carried by a print head of the system, and is deposited as a sequence of roads on a substrate in an x-y plane. The extruded part material fuses to previously deposited part material, and solidifies upon a drop in temperature. The position of the print head relative to the substrate is then incremented along a z-axis (perpendicular to the x-y plane), and the process is then repeated to form a 3D part resembling the digital representation.

In fabricating 3D parts by depositing layers of a part material, supporting layers or structures are typically built underneath overhanging portions or in cavities of objects under construction, which are not supported by the part material itself. A support structure may be built utilizing the same deposition techniques by which the part material is deposited. The host computer generates additional geometry acting as a support structure for the overhanging or free-space segments of the 3D part being formed. Support material is then deposited from a second nozzle pursuant to the generated geometry during the printing process. The support material adheres to the modeling material during fabrication, and is removable from the completed 3D part when the printing process is complete.

In addition to the aforementioned commercially available additive manufacturing techniques, a novel additive manufacturing technique has emerged, where particles are first selectively deposited in an imaging process, forming a layer corresponding to a slice of the part to be made; the layers are then bonded to each other, forming a part. This is a selective deposition process, in contrast to, for example, selective sintering, where the imaging and part formation happens simultaneously. The imaging step in a selective deposition process can be done using electrophotography. In two-dimensional (2D) printing, electrophotography (i.e., xerography) is a popular technology for creating 2D images on planar substrates, such as printing paper. Electrophotography systems include a conductive support drum coated with a photoconductive material layer, where latent electrostatic images are formed by charging and then image-wise exposing the photoconductive layer by an optical source. The latent electrostatic images are then moved to a developing station where toner is applied to charged areas of the photoconductive insulator to form visible images. The formed toner images are then transferred to substrates (e.g., printing paper) and affixed to the substrates with heat or pressure.

SUMMARY

A method of additive manufacturing utilizing selective layer deposition includes measuring a transfuse force between a transfuse roller and a part build surface. An angular position of the transfuse roller is measured over time. A component of a transfuse force variation that is periodic in a rotational period of the transfuse roller is estimated, and a vertical position between the transfuse roller and the part build surface is adjusted to reduce pressure variations in transfuse roller force on the build part surface A selective layer deposition based additive manufacturing system includes a roller having a load cell to determine a pressure on the roller based on an angular position of the roller, and a platen adjustable in height during a roller transfuse process. A controller is configured to adjust a height of the platen to reduce variation in pressure on the roller during the roller transfuse process.

In a still further embodiment, a selective layer deposition based additive manufacturing system includes a build platform holding previously built layers of material and a conveyor, conveying a next layer of material. A controller is configured to measure a transfuse force between the transfuse roller and a part build surface and measure an angular position of the transfuse roller over time. A component of a transfuse force variation that is periodic in a rotational period of the transfuse roller is estimated, and a vertical position between the transfuse roller and the part build surface is adjusted to reduce pressure variations in transfuse roller force on the build part surface.

In an embodiment, a method of additive manufacturing utilizes a selective layer deposition process, the method measuring a transfuse force between a transfuse roller and a part build surface; measuring an angular position of the transfuse roller over time; estimating a component of a transfuse force variation that is periodic in a rotational period of the transfuse roller; and determining a periodic height adjustment between the part build surface and the transfuse roller to reduce pressure variations in transfuse roller force on the build part surface. This measuring force can be measured at various locations, such as at the interface between the roller or the part, but also in some circumstances be measured at the build platform.

In an embodiment, the method further includes adjusting a vertical position between the transfuse roller and the part build surface to reduce pressure variations in transfuse roller force on the build part surface.

In an embodiment, the method further includes a vertical position between the transfuse roller and the part build surface includes modulating the vertical position of the build platform to compensate for transfuse roller runout and reduce variations of the transfuse force based on transfuse roller angular position.

In an embodiment, adjusting a vertical position between the transfuse roller and the part build surface includes adjusting a vertical position of a build platform on which the part is built.

In an embodiment, adjusting a vertical position of a build platform includes oscillating the vertical position of the build platform to counter pressure variations between the transfuse roller and the part build surface.

In an embodiment, oscillating the build platform includes oscillating in a sinusoidal oscillation pattern of about 1/1000 of an inch.

In an embodiment, measuring a transfuse force between a transfuse roller and a part build surface includes measuring force between the transfuse roller and a part being built on the build platform with a load cell positioned to react the load on a bearing at an end of the transfuse roller on an axel having an axis of rotation.

In an embodiment, a transfuse force further includes: measuring force between the transfuse roller and a part being built on the build platform with a second load cell positioned to react the load on a bearing at an opposite end of the transfuse roller on its axis of rotation; and averaging the measured forces of the load cells to set the transfuse force.

In an embodiment, further including determining a build platform height adjustment is based on a lookup table generated based on the measured transfuse force during a calibration routine.

In an embodiment, further including determining a build platform height adjustment is based on a sine or cosine pattern of force as measured by a load cell on the transfuse roller during a calibration routine.

In an embodiment, the selective layer deposition based system prints with an electrostatographic process.

In an embodiment, a selective layer deposition based additive manufacturing system has a platen adjustable in height during a roller transfuse process; a roller having a load cell configured to measure a pressure between the roller and a part being built on the build platform of the system, based on an angular position of the roller; and a controller configured to adjust a height of the platen to reduce variation in pressure on the roller during the roller transfuse process.

In an embodiment the load cell is positioned to react the load on a bearingat an end of the transfuse roller on its axis of rotation.

In an embodiment, a second load cell is positioned to react the load on a bearing at an opposite end of the transfuse roller on its axis of rotation.

In an embodiment, the controller is configured to: estimate a component of a transfuse force variation that is periodic in a rotational period of the transfuse roller; and determine a build platform periodic height adjustment to reduce pressure variations in transfuse roller force on the build part surface.

In an embodiment, the controller is configured to adjust a vertical position between the transfuse roller and the part build surface to reduce pressure variations in transfuse roller force on the build part surface.

In an embodiment, the selective layer deposition based system is an electrostatographic system.

In an embodiment, a selective layer deposition based additive manufacturing system has build platform holding previously built layers of material, the build platform adjustable in height during a transfuse process; a conveyor, conveying a next layer of material; and a controller, wherein the controller is configured to: measure a transfuse force between the transfuse roller and a part build surface; measure an angular position of the transfuse roller over time; and estimate a component of a transfuse force variation that is periodic in a rotational period of the transfuse roller.

In an embodiment the controller is configured to: determine a build platform periodic height adjustment to reduce pressure variations in transfuse roller force on the build part surface.

In an embodiment, the system is configured to adjust a vertical position between the transfuse roller and the part build surface to reduce pressure variations in transfuse roller force on the build part surface.

In an embodiment a load cell is positioned to react the load on a bearing at an end of the transfuse roller on its axis of rotation to measure a pressure between the roller, the load cell coupled to the controller to provide the measurement of pressure thereto.

In an embodiment, a second load cell is positioned to react the load on a bearing at an opposite end of the transfuse roller on its axis of rotation to measure a pressure between the roller, the second load cell coupled to the controller to provide the measurement of pressure thereto, and the controller configured to average the measured pressures to set the transduce force.

In an embodiment, wherein the selective layer deposition based system is an electrostatographic system. TRANSFUSE ROLLER TRACKING IN SELECTIVE LAYER DEPOSITION BASED ADDITIVE MANUFACTURING Definitions Unless otherwise specified, the following terms as used herein have the meanings provided below:

Directional orientations such as "above", "below", "top", "bottom", and the like are made with reference to a direction along a printing axis of a 3D part. In the embodiments in which the printing axis is a vertical z-axis, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, the terms "above", "below", "top", "bottom", and the like are relative to the given axis.

The term "electrostatography" refers to the formation and utilization of latent electrostatic charge patterns to form an image of a layer of a part, a support structure or both on a surface. Electrostatography includes, but is not limited to, electrophotography where optical energy is used to form the latent image, ionography where ions are used to form the latent image and/or electron beam imaging where electrons are used to form the latent image.

The term "providing", such as for "providing a material" and the like, when recited in the claims, is not intended to require any particular delivery or receipt of the provided item. Rather, the term "providing" is merely used to recite items that will be referred to in subsequent elements of the claim(s), for purposes of clarity and ease of readability.

The terms "about" and "substantially" are used herein with respect to measurable values and ranges due to expected variations known to those skilled in the art (e.g., limitations and variabilities in measurements).

BRIEF DESCRIPTION OF THE DRAWINGS

FIGS. 3A, 3B, 3C, and 3D are views of four different transfuse roller angular positions of a prior art system.

FIG. 4 is a graph of pressure versus angular rotation for the FIGS. 3A, 3B, 3C, and 3D.

FIGS. 5A, 5B, 5C, and 5D are views of four different transfuse roller angular positions of an embodiment of the present disclosure.

FIG. 6 is a graph of pressure versus angular rotation for the FIGS. 5A, 5B, 5C, and 5D according to an embodiment of the present disclosure.

DETAILED DESCRIPTION

The present disclosure relates to a system and method of controlling layer transfusion pressure to compensate of deformations on a nip roller in an electrostatography-based additive manufacturing system. While the present disclosure can be utilized with any electrostatography-based additive manufacturing system, the present disclosure will be described in association in an electrophotography-based (EP) additive manufacturing system. However, the present disclosure is not limited to an EP based additive manufacturing system and can be utilized with any electrostatography-based additive manufacturing system.

Figure 1:
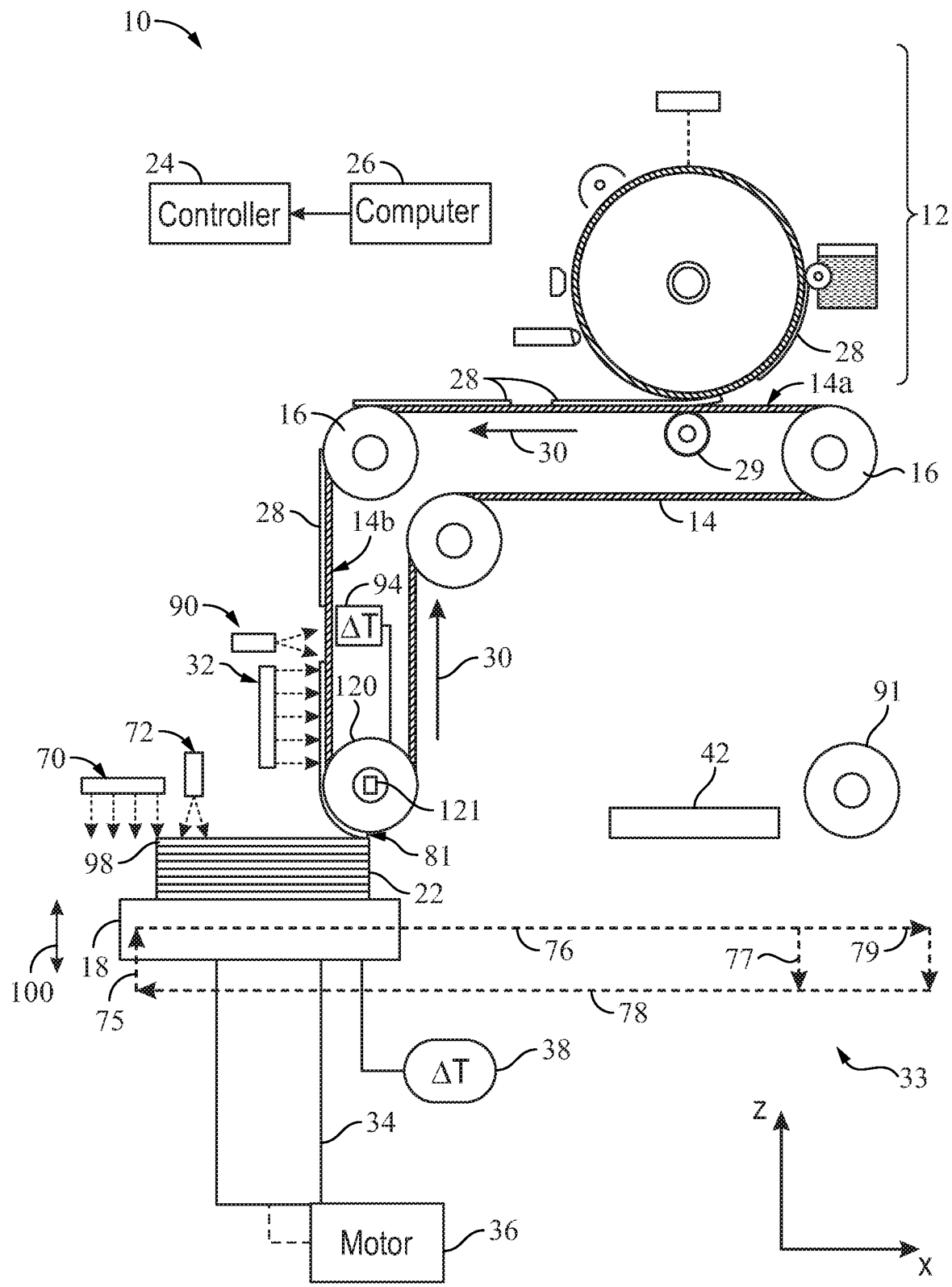
FIG. 1 is a schematic diagram of an additive manufacturing system in accordance with an embodiment of the present disclosure.

FIG. 1 provides a schematic diagram of an exemplary additive manufacturing system 10 for printing 3D parts and support structures in accordance with various embodiments. System 10 uses electrophotography to print successive layers of the 3D part and support structure.

In the shown embodiment, system 10 includes at least one EP engine 12 and typically two or more EP engines that have different materials, a conveyor consisting of transfer belt 14 and rollers 16, a build platform 18, a gantry 34, and belt-to-part transfer assembly 33 for printing 3D parts (e.g., 3D part 22) and any associated support structures (not shown). Examples of suitable components and functional operations for system 10 include those disclosed in U.S. Pat. Nos. 8,879,957 and 8,488,994.

In alternative embodiments, system 10 may include different imaging engines for imaging the layers. As discussed below, the partially unsupported layer transfer technique focuses on the transfer of part layers from belt 14 (or other transfer medium) to build platform 18 (or to the 3D part 22 being printed on build platform 18) to form unsupported portions on 3D part 22, rather than focusing on the particular imaging engine. However, the layer transfer technique is particularly suitable for use with electrophotography-based additive manufacturing systems (e.g., system 10).

System 10 also includes controller 24, which is one or more control circuits, microprocessor-based engine control systems, and/or digitally-controlled imaging processor systems, and which is configured to operate the components of system 10 in a synchronized manner based on printing instructions received from host computer 26. Host computer 26 is one or more computer-based systems configured to communicate with controller 24 to provide the print instructions (and other operating information). For example, host computer 26 may transfer information to controller 24 that relates to the sliced layers of 3D part 22 (and any support structures), thereby allowing system 10 to print 3D part 22 in a layer-by-layer manner.

The imaged layers 28 of the thermoplastic-based powder are then rotated to a first transfer region in which layers 28 are transferred from EP engine 12 to belt 14. Belt 14 is an example transfer medium or conveyor for transferring or otherwise conveying the imaged layers 28 from EP engine 12 to build platform 18 with the assistance of transfer roller 120. In the shown embodiment, belt 14 includes front or transfer surface 14a and rear or contact surface 14b, where front surface 14a faces EP engine 12. As discussed below, in some embodiments, belt 14 may be a multiple-layer belt with a low-surface-energy film that defines front surface 14a, and which is disposed over a base portion that defines rear surface 14b.

System 10 may also include biasing mechanism 29, which is configured to induce an electrical potential through belt 14 to electrostatically attract part layers 28 of the thermoplastic-based powder from EP engine 12 to belt 14.

Rollers 16 are a series of drive and/or idler rollers or pulleys that are configured to maintain tension on belt 14 while belt 14 rotates in the rotational direction of arrows 30. System 10 may also include service loops (not shown), such as those disclosed in U.S. Pat. No. 8,488,994.

Belt 14 conveys successive layers 28 from EP engine 12 to belt-to-part transfer assembly 33, which transfers each part layer onto previously transferred layers of part 22 in a layer-by-layer manner. Belt-to-part transfer assembly 33 optionally includes a selective fusing heater 90, a layer transfer heater 32, a uniform part transfer heater 70, a selective part transfer heater 72, a nip or transfer roller 120, an air knife or air tunnel 42 and a cooling roller 91. However, other configurations of belt-to-part transfer assembly 33 are also contemplated.

Transfer of a next layer 28 onto a previously transferred layer 98 begins by heating the fully-supported layer 28 on belt 14 to near an intended transfer temperature using layer transfer heater 32 prior to reaching transfer roller 120. Examples of suitable devices for heater 32 include non-contact radiant heaters (e.g., infrared heaters or microwave heaters), convection heating devices (e.g., heated air blowers), contact heating devices (e.g., heated rollers and/or platens), combinations thereof, and the like, where non-contact radiant heaters are preferred. Each layer 28 desirably passes by (or through) heater 32 for a sufficient residence time to heat the layer 28 to the intended transfer temperature.

Additionally, platen gantry 34 moves build platform 18 along the positive z-axis in the direction of arrow 75 and then, along, or through uniform part transfer heater 70 in the positive x direction of arrow 76. Gantry 34 is operated by a motor 36 based on commands from controller 24, where motor 36 may be an electrical motor, a hydraulic system, a pneumatic system, or the like. In the shown embodiments, build platform 18 is heatable with heating element 38 (e.g., an electric heater). Heating element 38 is configured to heat and maintain build platform 18 at an elevated temperature that is greater than room temperature (25° C.), such as at the desired average part temperature of 3D part 22. This allows build platform 18 to assist in maintaining 3D part 22 at this average part temperature.

In further embodiments, the temperature of build platform 18 is the bulk temperature (near $T_g$, or 120 degrees Celsius for ABS) within about 100 mils of the build plane. As the part grows in Z, the build platform temperature drops linearly with Z, generating a constant low thermal gradient and heat flow in Z, at roughly 18 degrees Celsius/inch. This reduces the risk of narrow vertical structures (posts and beams) becoming unstable. The gentle cooling rate is not sufficient to create substantial curl, but is sufficient to make tall parts mechanically robust.

Heater 70 heats the top surface of previously transferred layer 98 to an elevated temperature, such as at the same transfer temperature as heated layer 28 (or other suitable elevated temperature). Examples of suitable devices for uniform part transfer heater 70 include non-contact radiant heaters (e.g., infrared heaters or microwave heaters), convection heating devices (e.g., heated air blowers), contact heating devices (e.g., heated rollers and/or platens), combinations thereof, and the like, where non-contact radiant heaters are preferred.

Belt 14 then moves the heated layer 28 to a predetermined registration location 81, as shown. The z position of build platform 18 established by moving the build platform 18 in the positive z direction of arrow 75 causes a pressure to be applied to heated layer 28 as belt 14 moves heated layer 28 between transfer roller 120 and build platform 18 or part 22. The pressure on heated layer 28 is desirably high enough to transfer heated layer 28 to the previously-transferred layer 98 of part 22 (or to build platform 18). However, the pressure is also desirably balanced, including as described herein to maintain substantially constant pressure during a transfuse cycle, to prevent compressing 3D part 22 too much, thereby allowing 3D part 22 to maintain its dimensional integrity.

While build platform 18 remains engaged with belt 14, gantry 34 moves build platform 18 (and 3D part 22) along the x-axis in the direction of arrow 76, at a rate that is synchronized with the rotational rate of belt 14 in the direction of belt 14 at the bottom of transfer roller 120. This presses belt 14 and the heated layer 28 between the top layer 98 of 3D part 22 and transfer roller 120. Due to the heat and pressure, pressed layer 28 separates and disengages from belt 14 and transfers to top layer 98 of 3D part 22 at transfer roller 120.

Gantry 34 then moves transferred layer 28 past a cooler 42, such as an air knife or air tunnel 42, which cools the top exposed surface of the transferred layers to cool part 22. Gantry 34 then drops build platform 18 down along path 77, before moving build platform 18 in the negative x direction along path 78. The process is then repeated for the next layer.

During a transfusion process, when an image layer 28 is transferred to a build platform 18, the image layer 28 and build platform 18 make contact at a registration location 81, which is also a transfer or transfuse roller 120 nip point. Transfuse roller 120 may be considered to be a nip roller which may be an exemplary heatable element or heatable layer transfusion element, which is configured to rotate around a fixed axis with the movement of the belt 14. In the shown embodiment, the nip roller 70 is heatable with an optional heating element 94 (e.g., an electric heater). The heating element 94 is configured to heat and maintain nip roller 70 at an elevated temperature that is greater than room temperature (25° C.), such as at a desired transfer temperature for the image layers 28.

On parts built in a typical selective layer based additive manufacturing process, parts have variations in surface roughness or finish in a Z-direction. Closer inspection of the surface roughness or finish shows that the variations in surface roughness or finish contain a periodic pattern, such as but not limited to a sinusoidal or cosinusoidal variation. Inspection of parts shows in one embodiment about a multiple layer periodic variation in surface roughness or finish. One of the mechanisms that appears to drive this phenomenon is that it takes a plurality of imaged layers for a transfuse roller rotation to re-synchronize with an image start.

During rotation of the transfuse roller 120 and its contact with previous layers 98, the radius of an outer surface of a rubber-coated roller such as that used for transfuse roller 120 varies due to runout variations from the rotation of the roller, and/or radial variations in the roller rubber hardness/durometer. Inspection of the load cells 121 holding the bearings on the ends of the transfuse roller show significant (from less than +/−5% up to +/−30%) variations in transfuse force or transfuse pressure within and between frames. While some of this variation is due to part height effects, the majority appears due to variations in the transfuse roller effective radius or hardness with respect to axial orientation (e.g., radial runout).

Figure 2A:
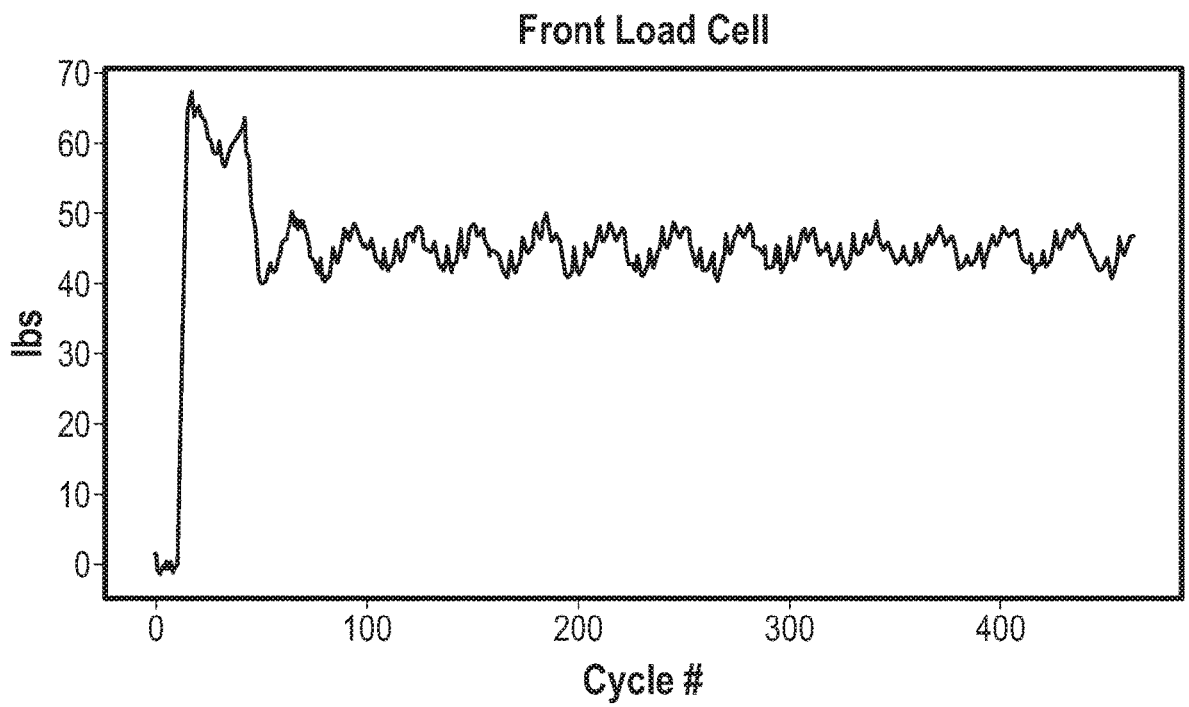
FIG. 2A is a graph of load cell pressure versus cycle number in an electrostatographic print system of the prior art.
Figure 2B:
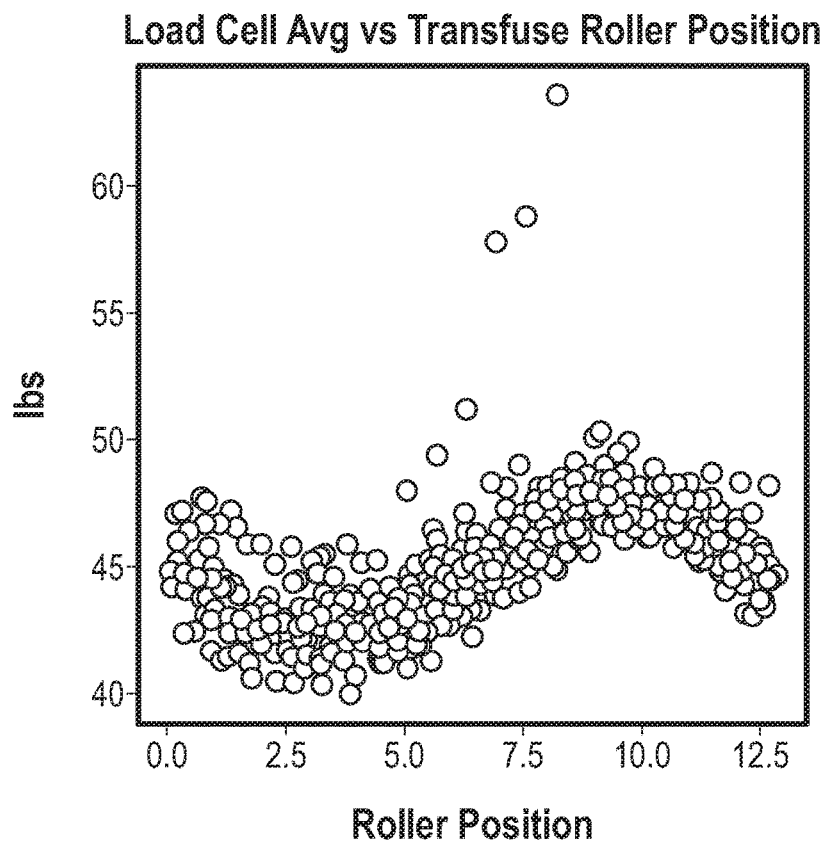
FIG. 2B is a graph of the periodic pattern of FIG. 2A as a function of the transfuse roller angular position.

FIG. 2A shows a graph of load cell pressure versus cycle number in a print system as described herein. At each transfusion event, an average load felt by the roller is measured. The plotted load appears as a repeating sinusoidal pattern when plotted vs the transfusion cycle data. As shown in FIG. 2B, the periodic pattern is also seen as a function of the transfuse roller angular position.

FIGS. 3A-3D are views of four different transfuse roller 120 angular positions, which show examples of how the outer surface of a rubber-coated roller may deviate from that of a perfect circle 302 centered at the axis 304, which is at a fixed vertical position as indicated by dashed line 306. When contact is made with the build platform 18 which is at a fixed vertical position 308 during a layer cycle, the rubber on the outside of the roller 120 deforms. The deformed rubber outer surface is shown in FIGS. 3A-3D as element 310. The load, or pressure measured by the load cells 121, is a function of a distance the roller rubber has to depress, and a local durometer of the rubber. The four roller angular positions, 312 of FIG. 3A, 314 of FIG. 3B, 316 of FIG. 3C, and 318 of FIG. 3D, illustrate four levels of nip roller compression. The variable differences 313, 315, 317, and 319 between the rubber roller outer surface 310 and the fixed build platform height 308 are illustrated in the respective FIGS. 3A, 3B, 3C, and 3D.

FIG. 4 shows a graph of pressure versus angular rotation for a fixed platen height 308 and fixed vertical position 306 of a roller axis of rotation 304. The large variation in pressure is evident for the fixed platen height 306.

A more consistent pressure during a transfuse cycle is desirable, in that it reduces issues with surface roughness or finish. In one embodiment, a build platform 18, as shown in FIG. 1 is programmably adjustable in height (in the Z-direction) during a layer transfuse process. This height adjustment is a periodic height adjustment of the build platform 18 used to offset force variations that would be present in a fixed build platform height such as those shown in FIGS. 2A-2B, 3A-3D, and 4. As shown in FIG. 1, arrow 100 indicates the direction of motion of the build platform during a layer transfuse process. The effect of this motion is further detailed in FIGS. 5A-5D, 6, and 7A-7B.

FIGS. 5A-5D are views of four different transfuse roller 120 angular positions, using one embodiment in which build platform height is programmably adjusted during a layer transfuse process. FIGS. 5A-5D show examples of how the outer surface of a rubber-coated roller may deviate from that of a perfect circle 302 centered at the axis 304, which is at a fixed vertical position as indicated by dashed line 306, but how the adjusted height 508 of the build platform 18 substantially equalizes the pressure (FIG. 6) because the different variations 513, 515, 517, and 519 between the outer surface of the roller 120 and the build platform 18 at height 508 are very similar.

When contact is made with the build platform 18 which is at a height 508 that is adjusted to counter the pressure variations present for a fixed height build platform 18, the load, or pressure measured by the load cells 121, is a function of a distance the roller rubber has to depress, and a local durometer of the rubber. The four roller angular positions, 312 of FIG. 5A, 314 of FIG. 5B, 316 of FIG. 5C, and 318 of FIG. 5D, illustrate four levels of nip compression that are substantially equal due to the periodic adjusted height 508 of the build platform 18. The similar differences 513, 515, 517, and 519 between the rubber roller outer surface 310 and the adjustable build platform height 508 are illustrated in the respective FIGS. 5A, 5B, 5C, and 5D.

FIG. 6 shows a graph of pressure versus angular rotation for an adjustable platen height 508 and fixed vertical position 306 of a roller axis of rotation 304. The small variation in pressure is evident for the adjustable platen height 306.

Figure 7A:
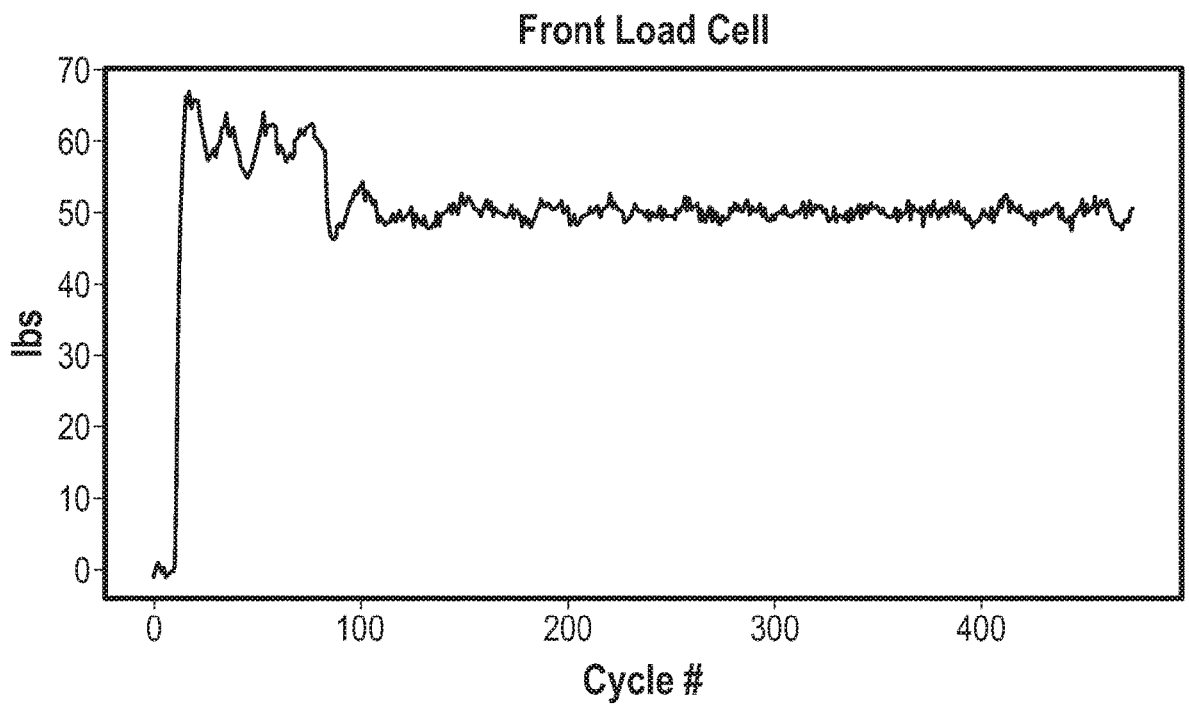
FIG. 7A is a graph of load cell pressure versus cycle number in an additive manufacturing print system according to an embodiment of the present disclosure.
Figure 7B:
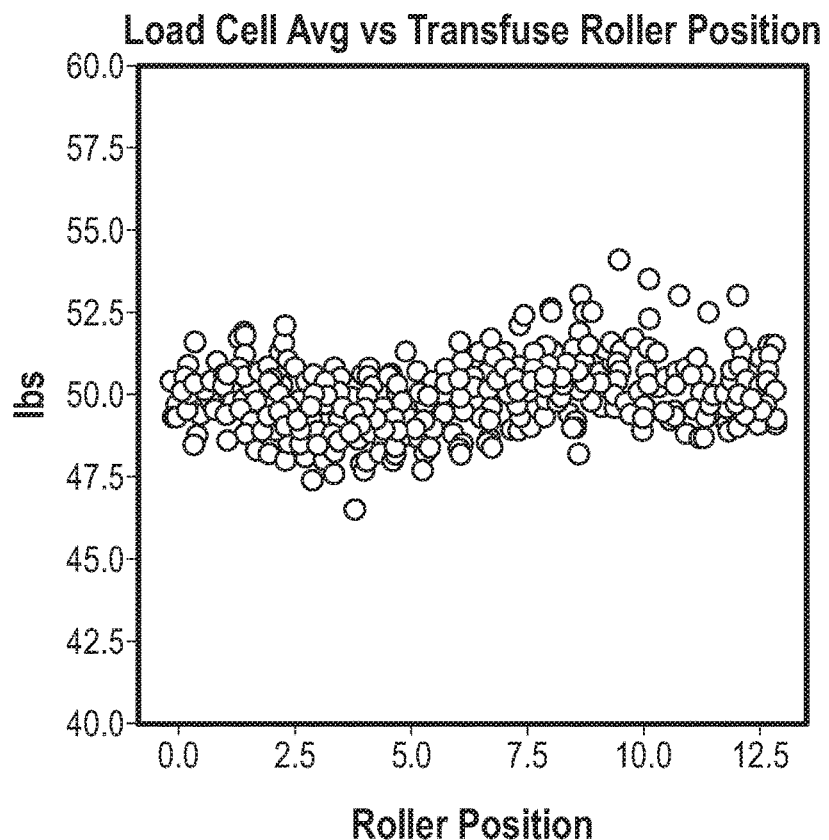
FIG. 7B is a graph of the periodic pattern of FIG. 7A as a function of the transfuse roller angular position.

FIG. 7A shows a graph of load cell pressure versus cycle number in a print system as shown in FIG. 6, with a programmably adjusted build platform height 508. As shown in FIG. 7B, the periodic pattern is also seen as a function of the transfuse roller angular position. Each of FIGS. 7A and 7B shows smaller variations in load cell pressure over cycles, and as a function of roller position. This is due to the programmably adjusted build platform height 508.

In one embodiment a desired height of the build platform 18 is calculated based on a known angular position (i.e., positions 312, 314, 316, 318, etc.) of the transfuse roller 120. A determination of build platform height 508 may be based in one embodiment on an equation, such as a sine or cosine, or in another embodiment on a look up table that is generated based on the measured load, as measured by load cells 121, during a calibration routine. In each case, a conversion is performed to obtain a determination of build platform displacement based on an amount of pressure measured by the load cells 121, for example, from pounds of error to inches of build platform displacement. If an equation is used, a phase setting is also used.

In one embodiment, the roller 120 is instrumented with load cells 121 on both ends of the roller 120 axel. These load cells 121 act as strain gauges that hold bearings on the ends of the transfuse roller 120. The gauges measure a transfuse force as a function of an angular position of the roller 120. For example, the transfuse force is measured by the load cells 121 as a function of a transfuse roller encoder position. At each transfusion event, an average load felt by the roller 120 is measured. The plotted load, which appears as a repeating sinusoidal pattern when plotted versus the transfusion cycle data and as a function of the transfuse roller angular position is adjusted in one embodiment by the application of adjusted height of the build platform during subsequent transfusion events to offset the pressure variation of a fixed height build platform.

In one embodiment, the build platform 18 is only adjusted in the manner described herein when a part 22 is under the transfuse roller 120. In this embodiment, the build platform height 508 being adjusted only during the actual transfuse process makes it easier to analyze the top of the part data, in one embodiment using smooth transitioning into and out of "oscillation mode" in a short spatial window. That is, when the top of the part data is being determined, the build platform 18 is at a constant height. However, in a different usage, for example in the process of printing a long part, build platform oscillation may be used substantially continuously. In that situation, the oscillation may potentially be removed from the top of part data.

Figure 8:
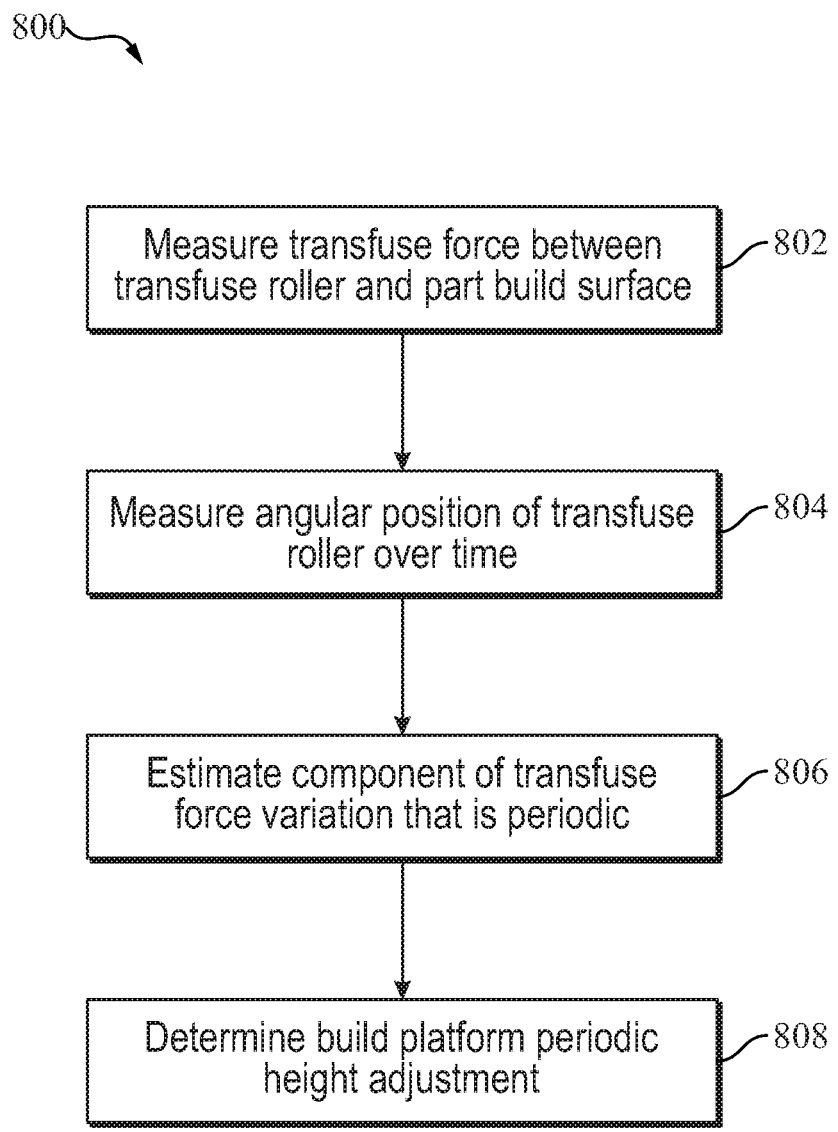
FIG. 8 is a flow diagram of a method according to an embodiment of the present disclosure.

A method 800 of additive manufacturing utilizing a selective layer deposition process is shown in FIG. 8. Method 800 comprises measuring a transfuse force between a transfuse roller and a part build surface in block 802 and measuring an angular position of the transfuse roller over time in block 804. A component of a transfuse force variation that is periodic in a rotational period of the transfuse roller is estimated in block 806. A build platform periodic height adjustment to reduce pressure variations in transfuse roller force on the build part surface is determined in block 808. In one embodiment, the selective layer deposition process is an electrostatographic based process.

Once the periodic height adjustment is determined, a vertical position between the transfuse roller and the part build surface is adjusted during the transfuse period to reduce pressure variations in transfuse roller force on the build part surface. Adjusting a vertical position between the transfuse roller and the part build surface in one embodiment comprises modulating the vertical position of the build platform to compensate for transfuse roller runout and reduce variations of the transfuse force based on transfuse roller orientation.

In another embodiment, adjusting a vertical position between the transfuse roller and the part build surface comprises adjusting a vertical position of a build platform on which the part is held. Adjusting a vertical position of a build platform comprises oscillating the vertical position of the build platform to counter pressure variations between the transfuse roller and the part build surface. Oscillating the build platform comprises oscillating in a sinusoidal oscillation pattern of about 1/1000 to a few thousandths of an inch.

In one embodiment, measuring a transfuse force between a transfuse roller and a part build surface comprises measuring with a load cell on an axis of rotation of the transfuse roller. Determining a build platform height adjustment is based in one embodiment on a lookup table generated based on the measured transfuse force during a calibration routine. In another embodiment, determining a build platform height adjustment is based on a sine or cosine pattern of force as measured by a load cell on the transfuse roller during a calibration routine.

Process comprises measuring pressure for at least a cycle of a transfuse roller printing a layer. The cycle of variation in radius of the rubber of the transfuse roller tends to be a sinusoidal or cosinusoidal variation. A result if this with a constant height platen or build plane results in overpressure and underpressure of the transfuse roller on the previously built part, which can lead to inconsistencies in part construction and quality. The oscillating nature of the pressure variations lends itself to correction by moving the platen in height to offset over- and underpressure transfuse roller pressures.

Although the present disclosure has been described with reference to preferred embodiments, workers skilled in the art will recognize that changes may be made in form and detail without departing from the spirit and scope of the disclosure.

What is claimed is:

1. A method of controlling layer transfusion pressure comprising:

supplying an additive manufacturing system comprising a transfuse roller, a build platform, a controller, and a height adjustment mechanism;

measuring a transfuse force between the transfuse roller and a part build surface disposed on the build platform with a load cell disposed on the transfuse roller;

measuring an angular position of the transfuse roller over time;

estimating a component of a transfuse force variation that is periodic in a rotational period of the transfuse roller as a function of the measured transfuse force and angular position of the transfuse roller over time; and determining a periodic height adjustment between the part build surface and the transfuse roller to reduce pressure variations in transfuse roller force on the build part surface, wherein the pressure variations are correlated to the estimated transfuse force variation; and while transfusing layers of a part material to form a three-dimensional part, controlling the height adjustment mechanism with the controller to adjust a vertical position between the transfuse roller and the part build surface according to the determined periodic height adjustment, wherein controlling the height adjustment mechanism comprises increasing the vertical position between the transfuse roller and the part build surface as the periodic component of the transfuse force variation increases, and decreasing the vertical position between the transfuse roller and the part build surface as the periodic component of the transfuse force variation decreases.

2. The method of claim 1, wherein adjusting the vertical position between the transfuse roller and the part build surface comprises modulating the vertical position of the build platform to compensate for transfuse roller runout and reduce variations of the transfuse force based on transfuse roller angular position.

3. The method of claim 1, wherein adjusting the vertical position between the transfuse roller and the part build surface comprises adjusting a vertical position of the build platform on which the part is built.

4. The method of claim 3, wherein adjusting the vertical position of the build platform comprises oscillating the vertical position of the build platform to counter pressure variations between the transfuse roller and the part build surface.

5. The method of claim 4, wherein oscillating the build platform comprises oscillating in a sinusoidal oscillation pattern of about $\frac{1}{1000}$ of an inch.

6. The method of claim 1, wherein measuring the transfuse force between the transfuse roller and the build part surface comprises measuring force between the transfuse roller and a part being built on the build platform with the load cell positioned to react the load on a bearing at an end of the transfuse roller on an axle having an axis of rotation.

7. The method of claim 6, wherein measuring the transfuse force further comprises:

measuring force between the transfuse roller and the part being built on the build platform with a second load cell positioned to react the load on a bearing at an opposite end of the transfuse roller on its axis of rotation; and averaging the measured forces of the load cells to set the transfuse force.

8. The method of claim 1, wherein determining a build platform height adjustment is based on a lookup table generated based on the measured transfuse force during a calibration routine.

9. The method of claim 1, wherein determining a build platform height adjustment is based on a sine or cosine pattern of force as measured by the load cell on the transfuse roller during a calibration routine.

10. The method of claim 1, further comprising printing the layer using an electrostatographic process.

11. The method of claim 1, wherein the height adjustment mechanism comprises a gantry operated by a motor, wherein the motor is controlled by the controller.

12. The method of claim 11, wherein the build platform is disposed on the gantry and the gantry is configured to adjust the vertical position of the build platform relative to the transfuse roller according to the determined periodic height adjustment.

* * * * *